United States Patent
Milliken

[11] 3,930,685
[45] Jan. 6, 1976

[54] SOLIDS FLOW CONTROL DEVICE
[75] Inventor: Thomas Henry Milliken, Riverton, Wyo.
[73] Assignee: Western States Mining Partners, Ltd. "B", Riverton, Wyo.
[22] Filed: Oct. 31, 1974
[21] Appl. No.: 519,512

[52] U.S. Cl. .................... 302/15; 222/410; 259/41; 302/42; 302/56; 302/57
[51] Int. Cl.² ...................... B65G 53/30; B65G 3/06
[58] Field of Search ............ 302/15, 42, 51, 56, 57; 222/410; 259/36, 37, 40, 41

[56] References Cited
UNITED STATES PATENTS
2,692,702  10/1954  Church .............................. 222/410

Primary Examiner—Evon C. Blunk
Assistant Examiner—Jeffrey V. Nase
Attorney, Agent, or Firm—Bertha L. MacGregor

[57] ABSTRACT

Disclosed herein is a solids flow control device for controlling the rate of flow and the distribution of flow of solids in a continuous counter current contact between liquid and solid material, and more particularly to apparatus wherein an upwardly directed liquid flow counter currently contacts a solid material, and the downward movement of solids is maintained at a uniform rate across the horizontal cross section of the vessel. The device comprises a vessel in which solids move downwardly in a liquid-solid counter current system to a control mechanism in the form of a plurality of longitudinally parallel rotating rolls and baffles which occupy the entire horizontal cross section of the vessel and maintain the even downward movement of the solids at a uniform rate across the horizontal cross section of the vessel.

12 Claims, 3 Drawing Figures

SOLIDS FLOW CONTROL DEVICE

This invention relates to a solids flow control device for controlling the rate of flow and the distribution of flow of solids in a continuous counter current contact between liquid and solid material, and more particularly to apparatus wherein an upwardly directed liquid flow counter currently contacts a solid material. The apparatus may be employed in any process where there is an interaction between the solid and the liquid, such as, for example, heat transfer; removal of solute from the liquid by solid absorbents or zeolites; leaching of ores for recovery of valuable components of the ore, and the like.

Counter current liquid-solid processes wherein a solid absorbs or exchanges soluble contaminants from a liquid are most effective when the solid moves downwardly evenly across the entire cross section of the containing vessel and the liquid flows upwardly evenly across the entire cross section of the vessel. Such evenly distributed flows assure the maximum utilization of the capacity of the solid absorbent or zeolite, and minimize the amount of absorbent or zeolite used and the costs of regeneration of the solid absorbent or zeolite if it is reused or recycled.

Prior art practice, when using continuous counter current solid-liquid processes in industry, is to utilize a tank or cylindrical vessel with a conical bottom, in which the solids move downwardly to a flow control device at the bottom of the cone. Such commonly used devices are "star valves", vibrating plates, moving belts or rotating plates. While reasonably good control of the total rate of solids flow can be maintained in this fashion, friction on the walls of the vessel and the constriction of cross section by the cone or other shape of the bottom of the vessel cause wide variations in the distribution of the solids flow across the horizontal cross section of the vessel. The solids at the center of the vessel move downwardly more rapidly than those at the walls. Further, the cone can cause almost "dead areas" where it meets the bottom of the cylindrical vessel, and the solids at those points move extremely slowly in relation to those in the center, leading to inefficient utilization of the solid material and substantially increased cost of operation. Further, many of these prior art devices cause abrasion of the solid and loss of the absorbent or zeolite.

Many attempts have been made to correct or improve this mal-distribution of the solid flow pattern: baffles placed above the center of the cone to slow the rapid center flow; nested cones to channel the slower moving material from the periphery of the vessel toward the center; a series of horizontal plates within the cone with staggered holes in the plates. None, however, give a truly even distribution of the rate of solids movement across the horizontal cross section of the vessel.

Therefore the object of this invention is to provide a device or method whereby the downward movement of solids in a liquid-solid counter current system is maintained at a uniform rate across the horizontal cross section of the vessel.

A further object of this invention is to provide a method for increasing the efficiency of the removal of contaminants from liquids utilizing a downwardly moving bed of a solid absorbent or solid zeolite.

Another object of the invention is to provide mechanism for controlling the rate of flow and the distribution of flow of solids in a continuous counter current contact between liquid and solid material which avoids disintegration or abrasion of the solid material and consequent loss of said material.

Another object is to provide means for independent control of solids flow to compensate for wall friction in some areas by adjusting the speed of rotation of the roll or the width of the gap between the roll and associated baffle located in that area.

Another object is to provide means for adjusting the width of the gap between the rolls and associated baffles for the purpose of minimizing attrition, to give large flow for low revolutions per minute of the rolls, and to space the baffles to partially support solids and thereby prevent excessive pressure on the rolls.

Another object is to provide means in the baffles which serve to distribute the liquid flow uniformly in a horizontal cross section of the solids bed.

Other objects and advantages will be apparent from the drawings and following description of the invention.

Figure 1:
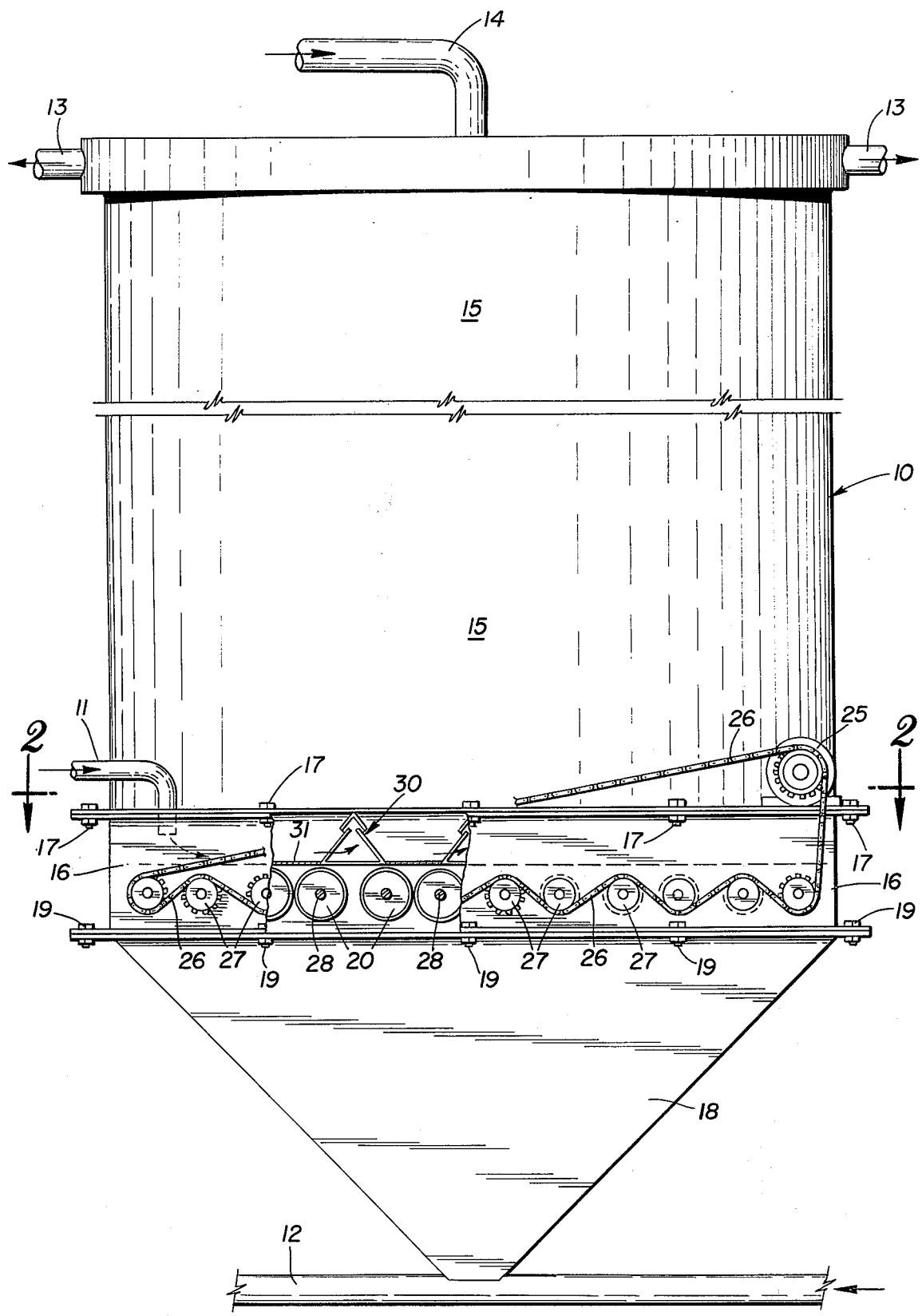
FIG. 1 is an elevational front view, partly in section, of a solids flow control device embodying my invention.

In the preferred embodiment of the invention shown in the drawings, a cylindrical tank 10 is provided with a fluid intake 11 and a lift fluid conduit 12. Overflow outlets are designated 13, and an auxiliary intake 14.

The upper portion 15 of the tank 10, which is the major portion, is filled with zeolite or other solid constituting a downwardly moving bed. The lower part 16 of the tank 10, shown as separately fabricated and connected to the upper portion 15 by bolts 17, has the same cross sectional area and dimensions as the upper part 15 for housing the solids flow control mechanism. Below the part 16 is a solids and lift fluid hopper 18 connected to the part 16 of the tank by bolts 19. The lift fluid conduit 12 communicates with the bottom of the hopper 18 for conveying solids and lift fluid to another container (not shown).

The control mechanism chamber in the bottom part 16 of the tank 10 has rotatably mounted therein a plurality of rolls 20 arranged in axially parallel pairs. The rolls of a pair are relatively close together, whereas the adjacent rolls of two pairs of rolls are spaced apart a greater distance. For example, if the rolls are 5 inches in diameter, the rolls of a pair may be approximately ¼ inch apart and the adjacent rolls of two pairs of rolls may be spaced 1 inch apart. The rolls 20 preferably are made of tubular steel 21 covered by a rubber sleeve 22. The series of rolls cover the total cross section of the bottom of the vessel and are grouped in contiguous pairs that turn counter to one another, each rotating toward the baffle (to be described) above it.

Figure 3:
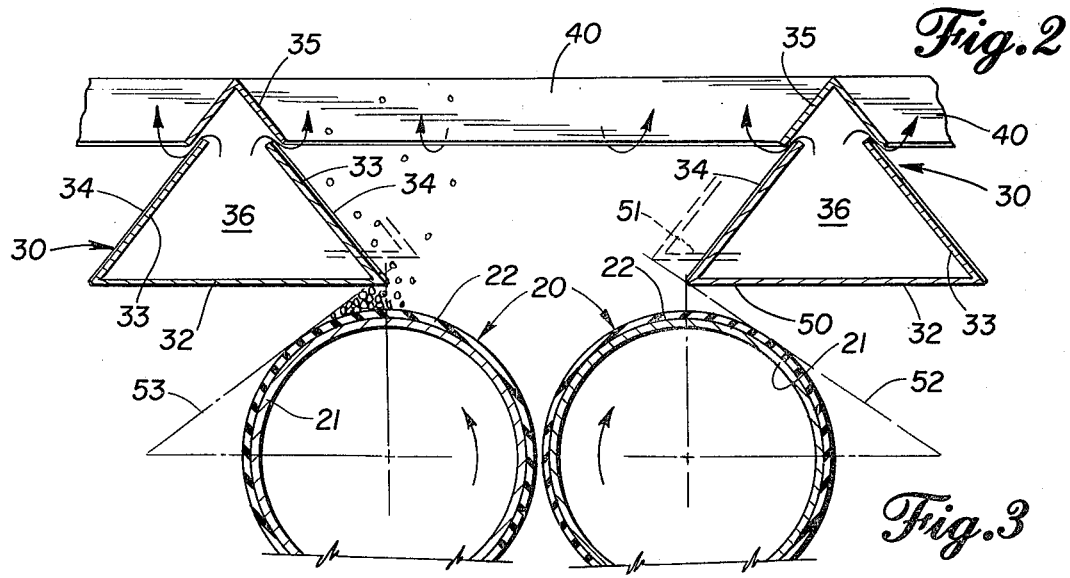
FIG. 3 is an enlarged view of a part of the apparatus shown in section in FIG. 1.

Any suitable drive means may be employed for rotating the rolls as shown by the arrows in FIG. 3, where the left hand roll rotates counter clockwise and the right hand roll rotates clockwise. The drive means shown in the drawings comprise a motor 25 and the chain 26 driven by the motor for engaging sprocket wheels 27 on shafts 28 of each roll 20.

Baffles 30 extend longitudinally above the rolls 20. In the preferred embodiment of the invention, the baffles 30 also serve as fluid conduits to distribute the liquid to be contacted with the solids uniformly across the horizontal cross section of the vessel. It is to be understood that this arrangement is not an essential part of the invention since the liquid could be introduced in a separate set of conduits above the baffles and rolls and be independent of the baffles.

Figure 2:
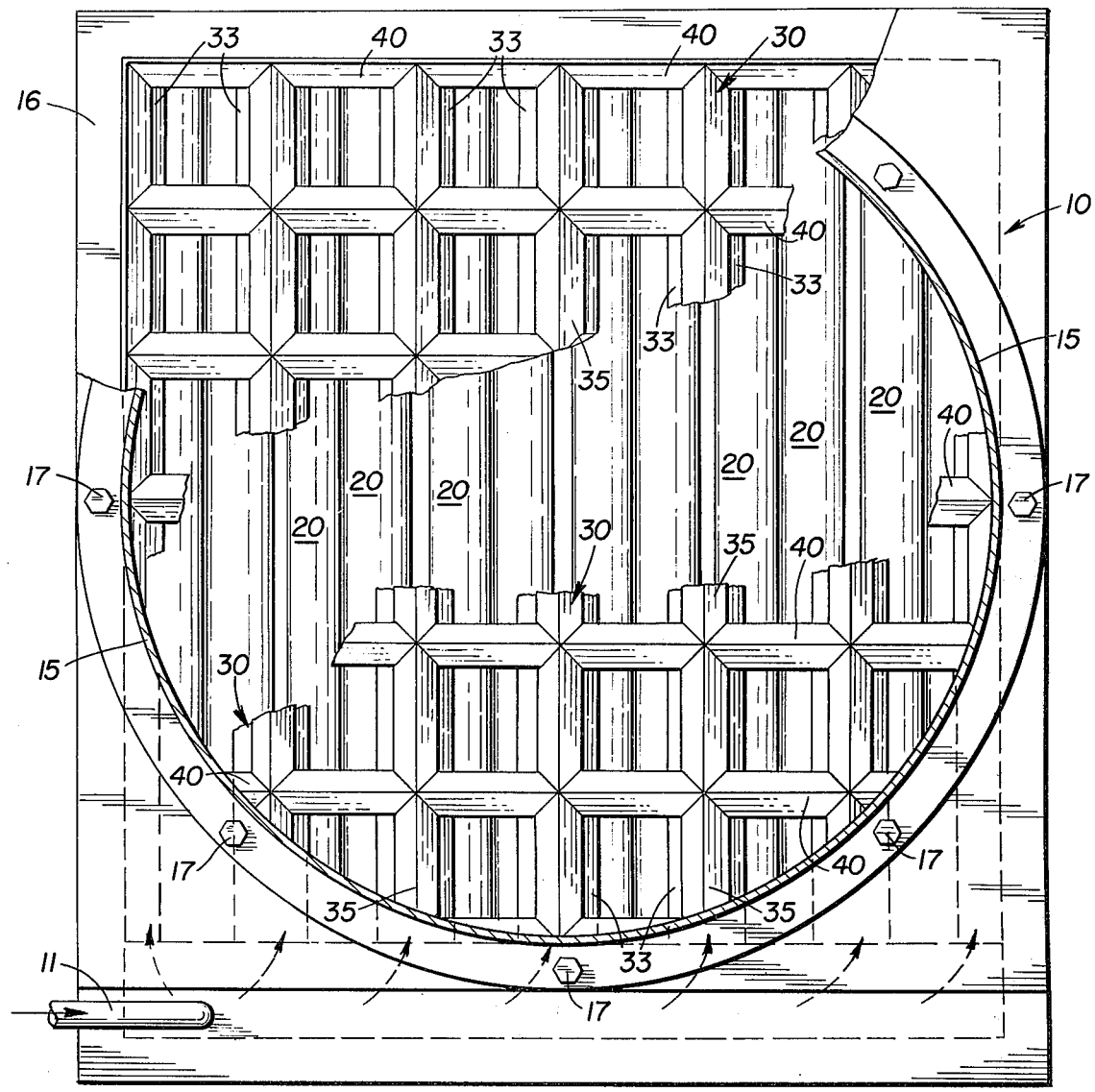
FIG. 2 is a horizontal transverse sectional view in the plane of the line 2—2 of FIG. 1.

The baffles 30 extend horizontally over the adjacent rolls 20 of two pairs of rolls, and are supported on a plate 31. The combination baffle-conduit comprises a horizontal bottom 32, sides 33 which extend upwardly from the bottom 32 toward each other but do not intersect, and are covered with a rubber layer 34. The upper edges of the sides 33 are spaced from an upper angle strip 35 which is parallel to the baffle 30 and rolls 20. Fluid entering the baffle-conduit passes out of the conduit chamber 36 between the sides 33 and angle strip 35. Angle strips 40, similar to the strips 35, extend transversely between the parallel strips 35 as shown in FIG. 2.

The baffles 30 may be mounted in selected positions relatively to the rolls as shown in FIG. 3. In solid lines each of two baffles is shown as having its proximate bottom edge portion 50 spaced one-half inch from a roll 20, and in broken lines a baffle is shown as having the corresponding member 51 spaced 1 inch from the nearest roll. The positioning and width of the baffles determine the width of the space or gap between the baffles and rolls through which solids in fluid pass in their flow from the moving bed of solids to the fluid-solids hopper 18.

In FIG. 3, the line 52 is a line drawn from the edge of the bottoms 50 or 51 of the baffle 30 tangentially to the roll 20. The line 53 indicates the angle of repose of a solids material passing through the gap between a roll and its baffle, said angle of repose varying according to the character of the solid material. The size of the gap will depend upon the particle size of the solid, the angle of repose of the solid particles in the liquid, and the desired rate of solids flow for a given rate of revolution of the rolls. Thus a solid in particulate form having a maximum particle size of 5 millimeters (approximately 0.2 inch) diameter would require a minimum of 6mm between the bottom of the baffles and top of the rolls.

The maximum space between baffle and roll is set by the angle of repose of the solid particles, their tendency to "bridge" and the diameter of the rolls. The angle of repose of the solids in the liquid must not be exceeded by a line drawn from the bottom edge of the baffle, such as line 52, tangentially to the roll in the direction the roll turns. The gap may be made larger by increasing the width of the baffle 30 so that the edge 51 extends beyond the vertical center of the roll, and thus maintain the proper angle of the line such as line 52 drawn tangentially to the roll. This angle is important for two reasons: If it exceeds the angle of repose the solids will flow through the gap even when the roll is not turning, and if it is substantially less than the angle of repose a crushing action will occur between the roll and the bottom of the baffle and lead to excessive attrition and loss of solid absorbent and zeolite.

Experimental tests have shown that, regardless of the speed of the rolls in revolutions per minute, the amount of solids delivered per revolution in each instance remained substantially the same; the deviations being less than plus or minus 2 per cent from the average.

Two tests were made on a laboratory model of the control device which had two 5 inch diameter rolls 6 inches long, set on 5⅛ inch centers. Above each roll baffles were set with their edges running the length of the rolls and approximately above the vertical centers of the rolls. A crushed solid with a mean particle size of 2.7mm (0.11 inch) with a range of 1.4 to 4.0mm (0.04 to 0.16 inch) and an angle of repose of 40° in water was used in water to test the device. The first test was run with the baffles edges set directly above the centers of the rolls with the gap or space of one-half inch. The second test was run with the baffles edges set 1 inch above the rolls and five-eighths inch past the center of the rolls. In both tests, the angle of a line 52 drawn from the edge of the baffle tangentially to the roll was approximately 35° or 5° less than the angle of repose 53. The data are shown in Tables I and II respectively.

TABLE I

| Rolls Revolutions Per Minute | ½" Gap Solids Flow Cubic Inches Per Minute | Cubic Inches of Solids per Revolution of Rolls |
| --- | --- | --- |
| 0.0 | 0 | — |
| 0.16 | 10.5 | 65 |
| 0.17 | 11 | 65 |
| 0.24 | 16.0 | 66 |
| 0.25 | 16.6 | 66 |
| | | 65.5 Average |

TABLE II

| | 1" Gap | |
| --- | --- | --- |
| 0.0 | 0 | — |
| 0.33 | 70 | 212 |
| 0.47 | 98 | 208 |
| 0.48 | 100 | 208 |
| 0.72 | 148 | 207 |
| 0.73 | 154 | 211 |
| | | 209 Average |

The described tests show that the apparatus of this invention permits independent control of solids flow to compensate for wall friction by adjusting the gap or the speed of roll rotation in that area; they further show that attrition may be minimized by adjusting the gap between baffle and roll to give large flow for low revolutions per minute of rolls, and by spacing of baffles to partially support the solids and thus prevent high solids pressure on rolls; and they further show that by introducing liquid through the baffles good distribution of liquid flow is obtained across the horizontal cross section of the vessel, and any particulate matter in the liquid entrapped by the solids is removed from the vessel by the downwardly moving solids so their accumulation in the bed of solids and resulting blockage of liquid flow is prevented.

In the operation of the device, upwardly directed liquid, such for example, as clarified sewage liquid, is delivered to the vessel 10 through intake 11, the vessel having been filled with selected solids for interaction with the liquid. The baffles 30 have been positioned relatively to the rolls as shown in FIG. 3, in the solid or broken lines, or intermediate positions. When the interaction has been completed, the liquid-solids pass into the hopper 18 for conveyance through conduit 12 to a regenerator vessel (not shown).

I claim:

1. A solids flow control device for controlling the rate of flow and the distribution of flow of solids in a continuous counter current contact between liquid and solids, comprising a. a vessel provided with liquid intake means near its bottom receiving upwardly directed liquid for interaction with a bed of solids free to move downwardly in the vessel, b. a series of rotatable rolls occupying the total cross section of the bottom of the vessel, said rolls being axially parallel and grouped in pairs in which the rolls of each pair turn counter to one another, each pair being spaced from an adjacent pair, c. a series of horizontal baffles located above the spaces between pairs of rolls, said baffles extending the length of the rolls and over the two nearest rolls to about their vertical center lines, and d. means rotating the rolls.

2. The device defined by claim 1, which includes a hopper connected to the vessel below the series of rolls for receiving interacted liquid-solids, and a lift conduit communicating with the hopper.

3. The device defined by claim 1, in which the vessel is cylindrical and is uniform in diameter throughout its height including the portion occupied by said rolls and baffles.

4. The device defined by claim 1, in which the rolls comprise a metallic tubular body and a resilient sleeve covering the body.

5. The device defined by claim 1, in which each baffle comprises a horizontal base member spaced from the rolls and an upper angle strip spaced from and parallel to said base member, said angle strip supporting solids in said moving bed and guiding the solids to passage in fluid between the baffle base member and rolls and into the spaces between adjacent pairs of rolls.

6. The device defined by claim 5, in which each baffle includes longitudinal side walls extending upwardly from the base member and spaced from the angle strip for distribution of liquid evenly over the horizontal cross section of the vessel through the spaces between side walls and angle strip.

7. The device defined by claim 5, in which the baffles are movable to adjust the space between baffles and rolls so that the angle of repose of the solids in the liquid passing between the baffles and nearest rolls is not exceeded by the angle of a line drawn from the bottom edge of the baffle tangentially to the nearest roll.

8. The device defined by claim 7, in which the baffles are movable relatively to the rolls in vertical directions, and a line drawn from the bottom edge of the baffle tangentially to the nearest roll may be varied by altering the width of the baffle base member.

9. A solids flow control for controlling the rate of flow and the distribution of flow of solids in a continuous counter current contact between liquid and solids comprising a. a vessel uniform in horizontal cross section throughout its height provided with liquid intake means near its bottom receiving upwardly directed liquid for interaction with a bed of solids free to move downwardly in the vessel, b. a series of rotatable rolls occupying the total cross section of the bottom of the vessel, said rolls being axially parallel and grouped in pairs in which the rolls of each pair turn counter to one another, each pair being spaced from an adjacent pair of rolls, c. a series of horizontal baffles located above the spaces between pairs of rolls, said baffles having base members which extend the length of the rolls and over the two nearest rolls to about their vertical center lines, side walls extending upwardly from the base members and forming with said base members conduits for liquid, and upper angle strips spaced from the side walls supporting solids in their passage downwardly to the rolls and between pairs of rolls, d. a liquid-solids receiving hopper connected to the bottom of the vessel below the rolls, and e. means rotating the rolls.

10. The device defined by claim 9, in which the means rotating the rolls comprises a sprocket wheel on an end of each roll, a chain engaging said sprockets, and a motor driving the chain.

11. The device defined by claim 9, in which the baffles are movable to adjust the space between the baffles and rolls so that the angle of a line drawn from the bottom edge of the baffle tangentially to the nearest roll exceeds the angle of repose of the solids in the liquid passing between the baffles and nearest rolls.

12. The device defined by claim 11, in which the baffles are movable relatively to the rolls in vertical directions, and a line drawn from the bottom edge of the baffle tangentially to the nearest roll may be varied by altering the width of the baffle base member.

* * * * *